US008660932B2

(12) United States Patent
Zhang et al.

(10) Patent No.: US 8,660,932 B2
(45) Date of Patent: Feb. 25, 2014

(54) METHOD AND SYSTEM FOR PROVIDING A QUOTATION AND RESERVATION MECHANISM FOR INTEGRATED AUCTION SERVICES ON A SELLER'S E-COMMERCE SITE

(75) Inventors: Zhong Zhang, Los Altos, CA (US); Yue Fang, Sunnyvale, CA (US); Birgit Starmanns, Mountain View, CA (US); Rupa Jaganathan, Mountain View, CA (US); Pavan Bayyapu, Sunnyvale, CA (US)

(73) Assignee: SAP AG, Wallforf (DE)

( * ) Notice: Subject to any disclaimer, the term of this patent is extended or adjusted under 35 U.S.C. 154(b) by 1381 days.

(21) Appl. No.: 11/591,219

(22) Filed: Oct. 31, 2006

(65) Prior Publication Data

US 2007/0112664 A1    May 17, 2007

Related U.S. Application Data

(60) Provisional application No. 60/731,259, filed on Oct. 31, 2005.

(51) Int. Cl.
*G06Q 40/00* (2012.01)
*G06Q 30/08* (2012.01)
*G06Q 40/04* (2012.01)

(52) U.S. Cl.
CPC .............. *G06Q 40/00* (2013.01); *G06Q 30/08* (2013.01); *G06Q 40/04* (2013.01)
USPC ............................................. 705/37; 705/35

(58) Field of Classification Search
CPC ........ G06Q 40/00; G06Q 30/08; G06Q 40/04
USPC ....................................... 705/37, 35
See application file for complete search history.

(56) References Cited

U.S. PATENT DOCUMENTS

| 7,107,228 | B1 * | 9/2006 | Walker et al. ................... 705/16 |
| 7,263,498 | B1 * | 8/2007 | Van Horn et al. ............... 705/26 |
| 2001/0029478 | A1 * | 10/2001 | Laster et al. ..................... 705/37 |
| 2001/0044751 | A1 * | 11/2001 | Pugliese et al. ................. 705/26 |
| 2006/0004649 | A1 * | 1/2006 | Singh .............................. 705/37 |
| 2007/0043651 | A1 * | 2/2007 | Xiao et al. ...................... 705/37 |

OTHER PUBLICATIONS

McDonald, G. (Aug. 1999). Sold! how to win at web auctions. PC World, 17, 195-207. Retrieved Oct. 11, 2013.*

* cited by examiner

*Primary Examiner* — Kito R Robinson
(74) *Attorney, Agent, or Firm* — Kenyon & Kenyon LLP

(57) ABSTRACT

An internal auction system may generate a quotation for the quantity of a product included in an auction published on the seller's e-commerce site so that the appropriate quantity of the product is identified and/or available on the successful completion of the auction. In conjunction with generating the quotation, a message may be sent to a seller's business information management system, such as for example an inventory control system, reserving an existing and/or anticipated quantity of the product to meet the quantity specified in the auction. This quotation may be rescinded if the auction does not successfully conclude. Otherwise, an order may be created in the business information management system anticipating the winner performing the necessary auction checkout procedures. The order may contain a block in order to prevent it from being further processed until the completion of the auction checkout process by the winning bidder. Upon completion of the auction checkout process, any blocks on the order that may exist are removed and the ordered is released.

7 Claims, 16 Drawing Sheets

| Reservation Identifier 310 | Auction Identifier 311 | Product 312 | Quantity 313 | Reservation End Date and Time 314 |

METHOD AND SYSTEM FOR PROVIDING A QUOTATION AND RESERVATION MECHANISM FOR INTEGRATED AUCTION SERVICES ON A SELLER'S E-COMMERCE SITE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a method and system for providing integrated auction services through a seller's e-commerce site. In particular, the present invention relates to a quotation and reservation mechanism used in conjunction with providing integrated auction services through a seller's e-commerce site.

BACKGROUND

Businesses traditionally look for effective ways in which to make their products available to potential buyers. In addition to sales through physical "brick and mortar" stores, innovative ways to sell products are often used especially to dispose of old or excess inventory. The advent of the Internet along with the accompanying revolution in computer and network technology has created new sales paradigms and allowed businesses to establish their own electronic commerce ("e-commerce") presence through the use of, for example, Internet Web sites. E-commerce sales have steadily grown and now account for a significant portion of business-to-consumer as well as business-to-business sales. Auctions make up a significant portion of e-commerce sales and have grown into an increasingly more important sales paradigm.

The revolution in network and computer capability along with the mass availability and development of the Internet facilitates alternative methods of sales such as auctions. Network-based electronic auctions, such as for example those conducted over the Internet, may allow a seller considerable control over an auction and may increase auction participation. For example, a seller may want to limit participation in the auction where the potential pool of potential customers is limited or where allowing an open auction may, in some manner, hinder the auction process. In another example where an auction may be open to all potential bidders it is often beneficial to maximize the number of people participating in the auction in order to extract the greatest price for the product or lot being auctioned. The Internet and network-based computing provide the ability to aggregate large numbers of bidders for an auction in an easier and generally less costly manner than through traditional auctions. Though network-based auctions (e.g., Internet based auctions) provide significant advantages, the reliance on third party auction providers has limited a seller's control in a number of ways including through rules on the conformance of auction procedures and the loss of control over restricting auction participation and bidding.

Third party auction providers provide a large scale e-commerce community portal that brings together large numbers of buyers and sellers who gather to trade in goods and services. Everyday, millions of items across thousands of categories are available on third party auction providers, for sale by auction and for a fixed price, enabling trade on a local, national, and international basis with customized Internet Web sites in markets around the world. These third party auction providers may provide auction services for the seller as well as access to a ready pool of potential buyers but in exchange they may require a seller to conform their auctioning processes and procedures. In addition, a third party auction provider typically takes a fee that may be fixed or proportional to the value of the auctioned goods and/or services. In both cases, the seller loses some degree of control over the auction process in exchange for using the third party auction service.

In addition to the limitations on auction procedures and processes imposed by a third party auction provider, a business may not be able to make maximum use of its business information in providing and generating auctions through a third party auction service. Businesses have typically kept their information, including information regarding their assets and inventory they wish to sell or auction off, in database systems that are part of their corporate information systems. Conventional systems provide limited linking between these business information management systems and online Web auction services and, therefore, manual involvement with the Web auction service is required for each auction or sales posting conducted. These problems may be overcome and the limitations of third party auction services avoided by providing auction services through a seller's own e-commerce site. In this manner, full advantage may be taken by linking a seller's business information management systems with its e-commerce site allowing greater automation of the auction submission, tracking, and post-auction processing. An integrated internal auction system solves these problems in a novel manner providing considerable advantages to a seller. In this manner, a seller may be able to implement an internal reservation and quotation system to support this internal auction system.

BRIEF DESCRIPTION OF THE DRAWINGS

FIG. 3 is an example data record for a reservation of a specified auction quantity of a product and/or service according to one embodiment of the present invention.

FIG. 11 is a screen shot from an internal auction application illustrating a seller's manual selection of one winning bidder for an auction according to one embodiment of the present invention.

DETAILED DESCRIPTION

Figure 1A:
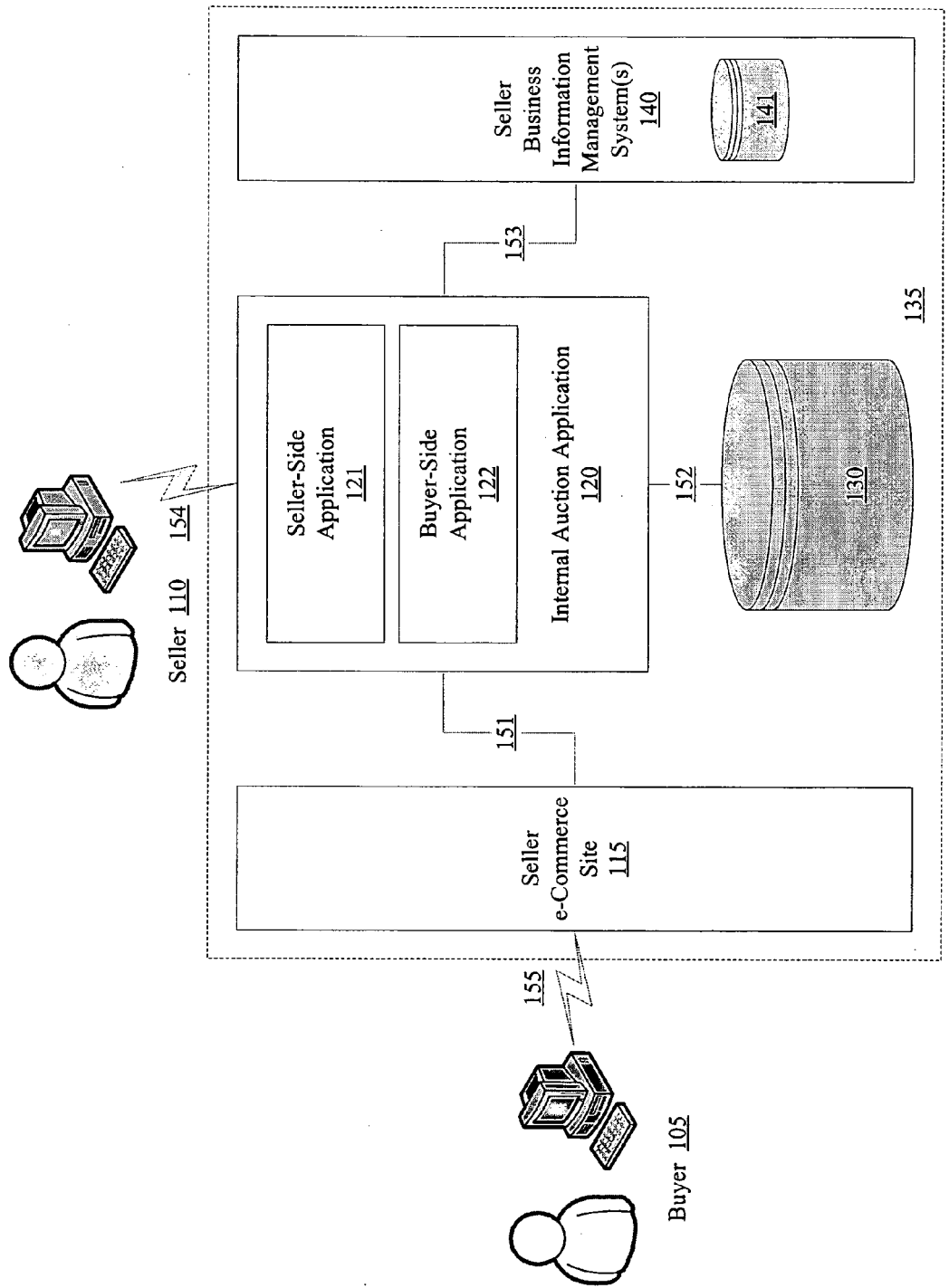
FIG. 1a is a diagram illustrating the integrated internal auction system according to one embodiment of the present invention.

According to one embodiment of the present invention, a method and system for providing an integrated auction capability through a seller's e-commerce site is provided through an internal auction system. The internal auction system may include a seller-side application to allow a seller to generate an auction using an available seller backend business information management system, publish the auction on a seller's e-commerce site, process an auction winner, and monitor ongoing auctions in manner leveraging a seller's existing business information management systems and e-commerce sites. The internal auction system may also include a buyer-side application to provide a buyer functionality on a seller's e-commerce site to view and participate in published auctions, to monitor auctions and bidding, and to perform any necessary checkout procedures on winning an auction. The internal auction system serves as the conduit between seller's business information management system(s) and e-commerce site(s) while providing seller and/or buyer functionality to implement an integrated auction capability under the seller's internal control (i.e., without using an external third party auction provider or facilitator).

In one embodiment of the present invention, the internal auction system may generate a quotation for the quantity of a product included in the auction published on the seller's e-commerce site so that the appropriate quantity of the product is identified and/or available on the successful completion of the auction. In conjunction with generating the quotation, a message may be sent to a seller's business information management system, such as for example an inventory control system, reserving an existing and/or anticipated quantity of the product to meet the quantity specified in the auction in one embodiment of the present invention. If the auction does not successfully conclude with a determined winner, the quotation may be rescinded according to this embodiment. If a reservation was created in a seller's business information management system, a message in conjunction with the rescinding of the quotation and/or the unsuccessful termination of the auction may be sent to the business information management system and any reserved quantities of the product associated with the auction may be released. If the auction successfully concludes with a determined winner, an order may be created in the business information management system anticipating the winner performing the necessary auction checkout procedures. The order may contain a block in order to prevent it from being further processed until the completion of the auction checkout procedures by the winning bidder. For example, in one embodiment of the present invention an order block may be created where further processing or modification of the order may be blocked until the winning bidder begins the auction checkout process. In another example in an alternative embodiment of the present invention a delivery block may be placed on the order allowing the order to be modified but not allowing the delivery of the product until the winning bidder completes the auction checkout process. In other embodiments of the present invention, the order may be generated at a later time or other blocks on the order may also be placed. Alternatively, an order in the business information management system will be created only after the winner (i.e., the winning bidder) successful completes the auction checkout procedures. During the auction checkout procedures in one embodiment of the present invention, a winning bidder may modify an order by making any permitted changes such as for example to by including other products in the auction order. In an alternative embodiment, such order modification may not be permitted. Also during the auction checkout process, the winning bidder provides shipping and payment information as necessary along with any other information necessary to complete the order. Upon completion of the auction checkout process, any blocks on the order that may exist are removed and the ordered is released. The primary embodiment discussed above is only one example embodiment of implementing a method and system for reserving a quantity of product for an auction on a seller e-commerce according to one embodiment of the present invention.

A system and method are provided in a further embodiment for checking the available quantity of a product and/or service in an internal auction system. An internal auction application is used to determine the available quantity using one or more seller business information management systems. This available quantity may be presented to the seller and may used in at least one point during the internal auction process such as, for example, auction creation, publishing/activation, and/or order generation according to this embodiment. During auction creation, the available quantity may be presented to the seller to inform and/or limit the seller regarding the specified quantity in the auction being created. During auction publication/activation, the available quantity may be used to warn and/or prevent the seller from making an auction available to bidder/buyers if a sufficient quantity of the product and/or service is not available or anticipated for auction fulfillment. During auction completion, the available quantity may be used to determine if a sufficient quantity exists for order fulfillment and therefore determine if a winning bidder may be selected. During order generation, the available quantity may be used to confirm satisfactory order creation for a winning auction bidder.

According to one embodiment of the present invention, the internal auction application links a seller's e-commerce site with a seller's existing business information management system(s) in order to provide auction services to buyers through the seller's e-commerce site. A seller's e-commerce site according to this embodiment may be any electronic business presence that a seller provides to potential buyers. For example, a seller's Web site on the Internet that offers information on or purchase of seller's products can be considered a seller's e-commerce site. A seller's business information management system according to this embodiment may be any seller information system containing product and/or sales and marketing information that may be used in the provision of products to a buyer. For example, a seller's inventory system that tracks the availability of seller's products may be considered one form of many potential seller's business information management systems. A seller's business information management system implies business applications using a programming and/or program interface working with a database to accomplish one or more tasks. However, according to this embodiment a seller's business information management system may be considered the database and the interface to access the database by itself as well as this database and associated interface in conjunction with associated applications. The internal auction application according to this embodiment provides the functionality to implement the auctioning of seller products (i.e., products sold by the seller) on the seller's e-commerce site in conjunction with using at least one of the seller's business information management systems. In one embodiment, the internal auction system is a component-based multi-tier application developed according to the Java® 2 platform, enterprise edition standard (J2EE®) and running on top of a web application server. The auction application is linked to a business information management system using business information management system plug-ins to tie the auction application to the business information management system backend functions.

FIG. 1a is a diagram illustrating the integrated internal auction system according to one embodiment of the present invention. A seller 110 may create an auction using an internal auction application 120 residing on the seller's information technology hardware environment 135. For example, the internal auction application 120 may consist of one or more software applications, programs, modules, procedures, or other computer code to include firmware and may additionally include data that resides on one or more servers, computers, or other hardware platforms that make up the seller's information technology hardware environment 135. The internal auction application 120 may be conceptualized as containing a seller-side application 121 handling the seller interaction 154 with the integrated internal auction system 100 through the internal auction application 120. The seller-side application 121 may provide the functionality allowing the seller 110 to create, monitor, and manage one or more auctions. The internal auction application 120 may also be conceptualized as containing a buyer-side application 122 handling the buyer interaction 155 with the integrated internal auction system 100 allowing buyer interaction 155 with the internal auction application 120 and the seller's business information management system(s) 140 through a seller's e-commerce site 115. The buyer-side application 122 may provide the functionality allowing the buyer 105 to view auctions, participate in active auctions, monitor auctions, and perform the checkout process on won auctions. Though conceptually the functionality provided by the seller-side application 121 and the buyer-side application 122 of the internal auction application 120 are different, both may share data sets, procedures, libraries, and other elements of software code or data. In one embodiment of the present invention, all the elements of the internal auction application 120 may either be contained in both the conceptual subsets—seller-side application 121 and buyer-side application 122—or in an alternative embodiment the internal auction application 120 may contain additional elements of software code and/or data in addition to these conceptual subsets 121, 122. The internal auction application 120 uses data that may be contained in a seller's business information management system(s) 140 and/or may be stored in a local database 130 for the internal auction application 120. This local database 130 may be considered part of the internal auction application 120 in this embodiment of the present invention even if the database is stored separately in a memory system.

An internal auction application 120 may communicate 152 with the local database 130; communicate 153 with the seller's business information management system(s) 140; and communicate 151 with the seller's e-commerce site 115 using a communication network that is part of the seller's information technology hardware environment 135. For example, the seller's e-commerce site 115, internal auction application 120, local database 130, and business information management system(s) 140 may be located on servers or other computers that are part of a communication network-such as a local area network (LAN) or wide area network (WAN)—controlled by the seller. In an alternative embodiment, the seller's information technology hardware environment 135 may include a communication network that is shared by the seller with other network users. For example, the seller's e-commerce site 115, internal auction application 120, local database 130, and business information management system(s) 140 may be located on servers or other computers that are part of at least one internal seller communication network (e.g., a LAN and/or WAN) as well as a shared (i.e., shared by seller with other non-seller related entities) communication network such as the Internet. In either embodiment regardless of the network used for communication between the elements of the integrated auction system 100, seller communication 154 and buyer communication 155 with the integrated auction system 100 may occur over an external network (i.e., a network external to the seller and not under the seller's direct control), such as for example, the Internet. In an alternative embodiment, seller and buyer communication 154, 155 with the integrated auction application 100 may occur over a seller-controlled network (such as a seller-controlled wide area sales network) and/or may involve a combination of at least one seller-controlled network and at least one external network.

The integrated auction system 100 integrates a seller's business information management systems(s) 140, which serves as a backend system(s), with a seller's e-commerce site 115, serving as a front-end system, using an internal auction application 120 in order to provide auction services to the seller 110 and the buyer 105 according to one embodiment of the present invention. A seller business information management system 140 is a an application with at least one associated database 141 typically using a database management system (DBMS) that provides data storage and associated programming support for that data (e.g., a query system such as an SQL editor, optimization routines, program interfaces). For example, a seller may have an inventory control system 140 with its own inventory database 141. The business information management system(s) 140 may contain product information and availability information used in generating an auction and performing order generation to fulfill a winning bidder's order according to one embodiment of the present invention. The seller's e-commerce site 110 allows a buyer 105 to participate in an auction over a communication network. For example, a seller Web site on the Internet offering goods and/or services (electronic commerce) is one example of a seller e-commerce site 115. An auction in the integrated auction system 100 is made available to the buyer 105 through the seller e-commerce site 115 which may serve as the buyer portal to the integrated auction system 100 according to one embodiment of the present invention. The seller 110 creates and manages auctions through the internal auction application 120 which integrates 153 information from the business information management system(s) 140 and provides the interaction processing 151 with the buyer 105 through the seller e-commerce site 115.

Figure 1B:
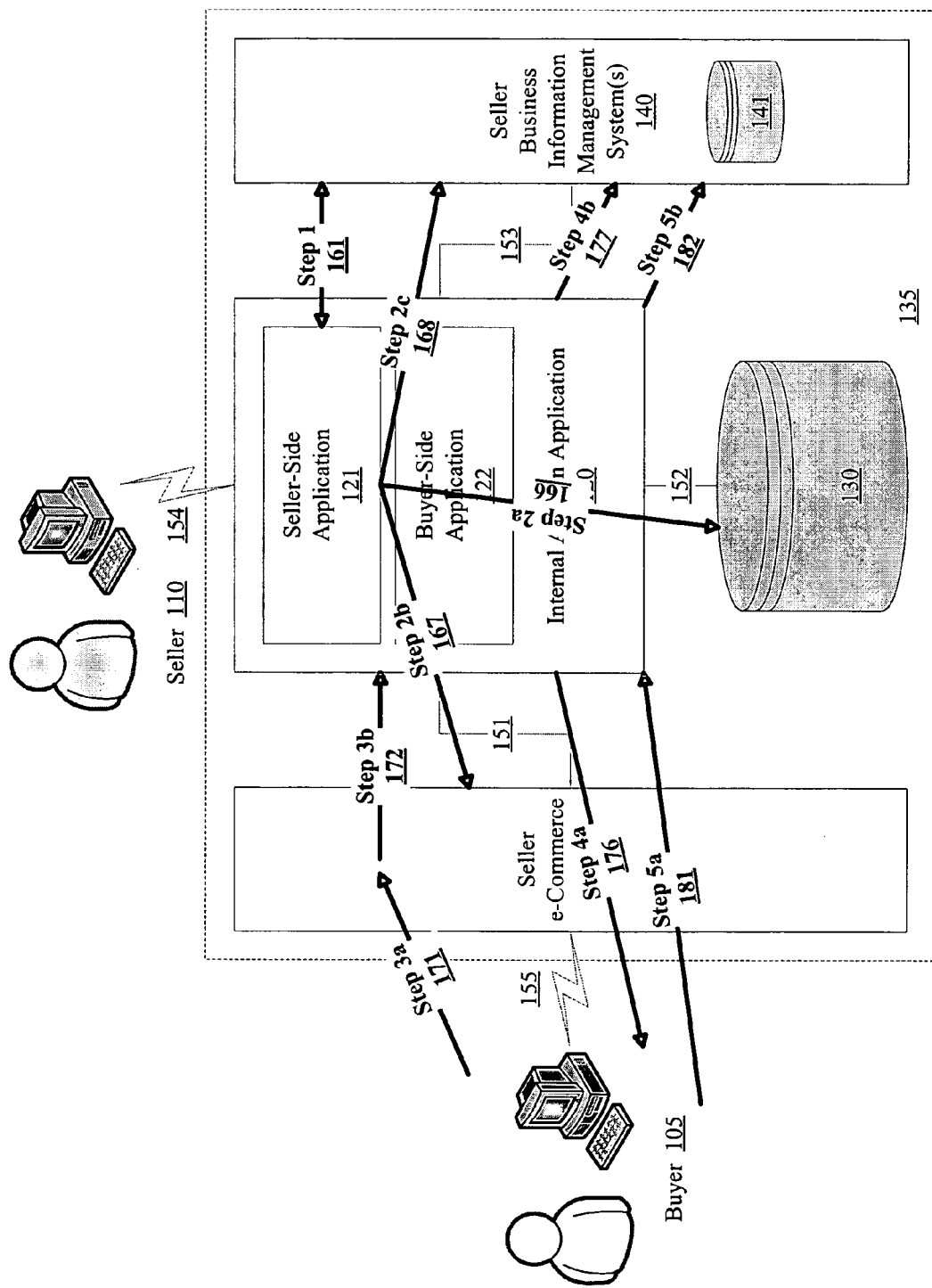
FIG. 1b is a diagram illustrating a general integrated auction process according to one embodiment of the present invention.

FIG. 1*b* is a diagram illustrating a general integrated auction process according to one embodiment of the present invention. FIG. 1*b* is similar to FIG. 1*a* but adds arrows to indicate the steps in this general integrated auction process. The illustration simplifies the process and is shown to further illustrate how the elements of the integrated auction system interact according to this embodiment. When a seller 110 creates an auction using the seller-side application 121 of the internal auction application 120, the internal auction application 120 integrates 161 information from the seller's business information management system(s) 140 in order to facilitate the auction creation process and to leverage the already existing asset(s) of the seller. In addition, the seller business information management system(s) 140 may be used to determine how much of a product and/or service is available to be auctioned and may be used to reserve the quantity of the product and/or service used in the auction so that it is not otherwise disposed of as discussed later in this specification. This first step 161 is the integration of the business information management system(s) 140 information to facilitate the generating of the auction according to this embodiment of the present invention.

The second step may have three distinct components 166-168 according to this embodiment of the present invention. The first part 166 of the second step is to save the created auction in the local database 130 of the internal auction application 120. The auction may be saved for later editing by the seller 110 if the auction is not published or activated (i.e., made available to the buyers). The publication and/or activation of the auction is the second part 167 of the second step according to this embodiment. Publication may be considered making the auction available to a buyer 105 at a particular start time specified during the auction creation process. Activation may be considered immediately making the auction available to a buyer 105 regardless of a specified start time—the immediate publication of the auction. Both terms are used interchangeably throughout this document and should not be considered a particular distinction unless specifically noted. The publication and/or activation 167 of the auction makes the auction available to the buyer 105 through the seller's e-commerce site 115.

The third step may be viewed as having two components 171-172 according to this embodiment. The buyer 105 bids 171 on the available auctions through the seller e-commerce site 115 in the first component 171 of the third step. The bids and bidding information are sent 172 from the seller e-commerce site 115 to the internal auction application 120 in the second component 172 of the third step. At the conclusion of the bidding for the auction which may be manually concluded by the seller or automatically concluded according to a guideline such as for example a specified end date and time or upon reaching a price threshold, the internal auction application 120 in a fourth step 176 may determine the winner automatically or through seller 110 intervention and sends notification 176 to the winning bidder 105 while updating the auction information in database 130 and on the seller e-commerce site 115. The winning buyer 105 may then perform any necessary checkout procedures 181 in the first part of the fifth step 181 in this embodiment. The checkout may be performed through the seller e-commerce site 115 and provides the internal auction application 120 any necessary information for completing the order for the goods and/or services. The second part 182 of the fifth step is the internal auction application 120 sending the necessary information for the generation or completion of the order to the appropriate seller business information management system(s) 140 so that the order for the auction winner 105 may be completed and processed by the seller. FIG. 1*b* shows a simplification of the interaction between the components of the integrated auction system 100 according to one embodiment of the present invention.

Figure 2:
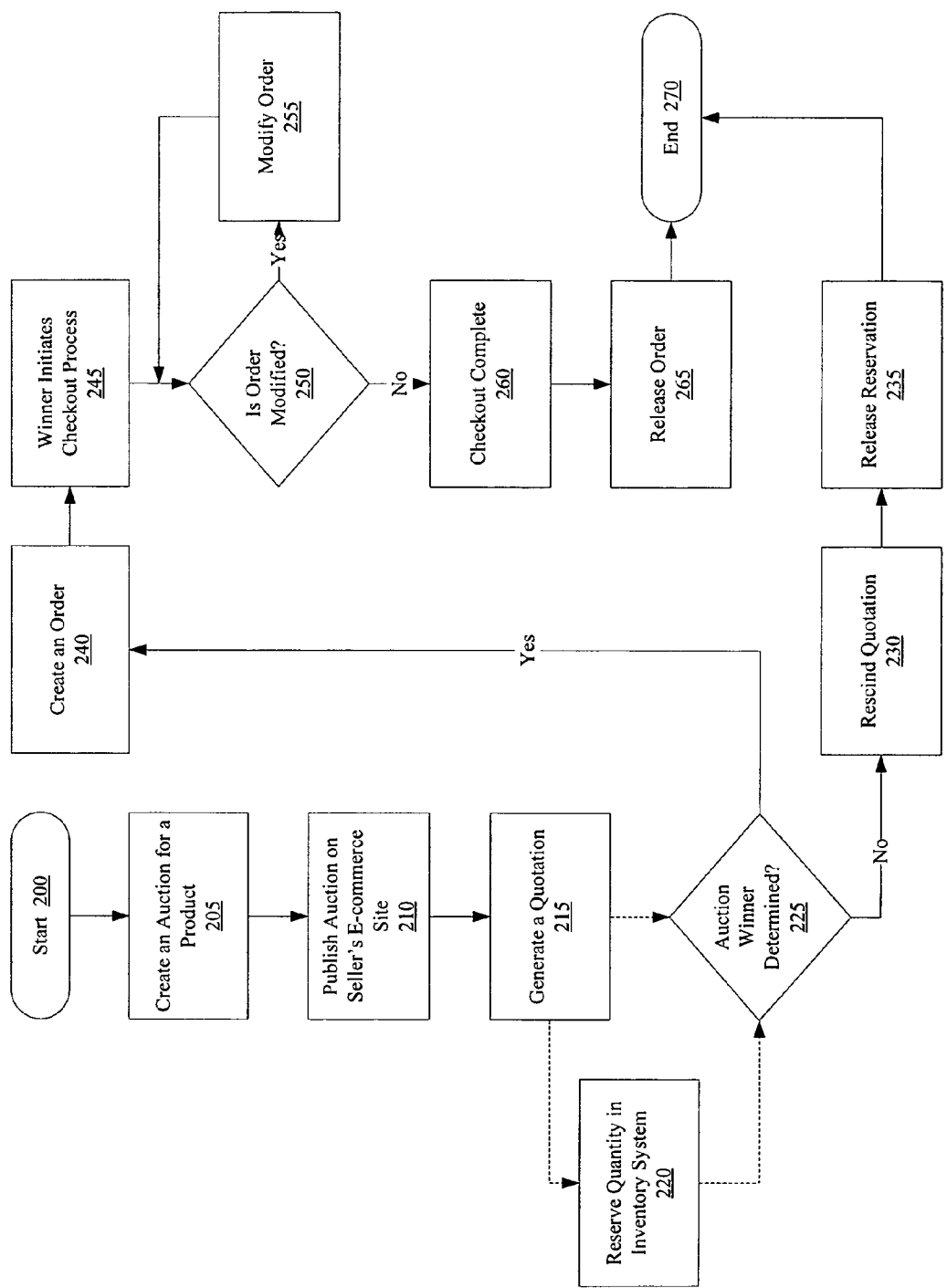
FIG. 2 is a flowchart illustrating the quotation and reservation process of the integrated auction system according to one embodiment of the present invention.

FIG. 2 is a flowchart illustrating the quotation and reservation process of the integrated auction system according to one embodiment of the present invention. The process begins 200 when an auction is created 205. An auction may be created 205 by a seller using the seller-side application of the internal auction application according to one embodiment of the present invention. As previously discussed, the seller-side application may provide the functionality within the internal auction application for the seller to create, manage, and/or monitor the auctions in the integrated auction system. As part of the auction generation process 205, the seller-side application of the internal auction application may determine the quantity of a product that is available for auctioning by retrieving the necessary information from the seller's business information management system(s). The available quantity of a product may be used in one embodiment to limit the quantity of the product that may be included in the auction in order to avoid a situation where a completed auction can't be fulfilled due to lack of the appropriate product inventory. Alternatively, the available quantity of the product may be used to provide the seller with a warning if an auctioned quantity exceeds an available quantity rather than preventing the auction from being generated. In a second alternative embodiment, an available quantity may not used during the auction generation step 205. The auction may then be published 210 in a further step whereby the auction is posted on a seller's e-commerce site and made available to potential buyers. Though a slight difference in meaning may exist between publishing and activating an auction as previously discussed, these terms are used interchangeably herein and refer to both publishing and activating an auction unless specifically stated otherwise. The publication process 210 may be initiated through the seller-side application of the internal auction application making the auction available to a buyer through the seller's e-commerce site according to this embodiment. As stated above with the auction generation process 205, at the time of auction publication 210 a determination may be made regarding whether an available quantity of the product to be auctioned exists and, if not, the publication is prevented in one embodiment or a warning is given in another embodiment while in a third embodiment no checking of the available quantity is performed at this point in the internal auction process.

The publication of the auction 210 may initiate the generation of a quotation 215. A quotation is a sales document specifying the product(s) and quantities quoted to a buyer for a potential sale, which in this case would encompass the published auction. Though the quotation is generated as a result of publishing or activating the auction in this embodiment, the quotation may be generated at other points in the process in alternative embodiments of the present invention. The quotation 215 in turn may be sent to seller business information management system such as for example an inventory system where the quoted quantities may be reserved 220 from the existing or anticipated quantities of the products. A reserved quantity 220 in the inventory system and/or in another appropriate business information management system may be used to secure the availability of the auctioned quantities of the product(s) to fulfill the auction offer. As stated, the reserved quantity may come from existing inventory or from anticipated inventory known in the inventory system and/or other business information management system(s) according to one embodiment of the present invention. According to this reservation, the reserved quantities of the product(s) in the business information management system(s) will not be otherwise released, for example, by not allowing other sellers or orders the ability to access the items and/or by not showing their availability in the inventory system and/or other seller business information management system. In an embodiment where a quotation 215 and a reservation 220 are used, they are both performed as separate steps that do not necessarily need to occur in sequence with each other. In an embodiment where only a quotation 215 is used and reserving the quantity 220 does not occur on publication of the auction 210 then the reservation step 220 is not performed as indicated by the dashed lines in FIG. 2.

Once an auction has been published 210 with any quotation 215 and/or reservation 220 generated, an auction is active until it concludes (terminating and concluding are used interchangeably herein regarding auctions). Auction termination may be caused by any number of reasons such as, for example, the seller manually concluding the auction or the auction automatically concluding. Whether an auction is automatically or manually concluded, an auction winner is determined if the auction successfully concludes and no auction winner is determined where the auction unsuccessfully concludes. An auction may automatically conclude for any number of reasons defined at the time of auction generation. For example, if no bids are received by a specified auction end date and time an auction may automatically terminate with no auction winner determined (i.e., unsuccessfully terminate). In another example, if the seller specifies price targets at the time the auction is generated and these price targets are not met by the specified end date and time of the auction, the auction may automatically terminate with no auction winner determined (i.e., unsuccessfully terminate). An auction may also automatically conclude in a traditional manner when a specified end date and time is reached with the highest bidder becoming the auction winner (i.e., the auction successfully terminates). An auction may also be set up to allow the seller to manual conclude the auction and/or to manually select auction winners. Regardless of how an auction concludes a determination 225 needs to be made regarding whether or not the auction has successfully identified a winner (i.e., the auction successfully terminated). Though a single winner is discussed for a successfully concluding auction, it is apparent that there may be multiple winners if more than one lot of an auction is created. For example, if an auction for 1 unit of product A is created with five 1 unit lots of product A there can be up to five auction winners.

If an auction does not successfully conclude with a determined winner 225, any generated quotation for the auction needs to be rescinded 230 and any associated reservation of the specified auction quantity in the seller's business information management system(s) needs to be released 235 before the integrated auction process ends 270. The sequence of rescinding the quotation 230 and releasing the reservation 235 may be reversed in an alternative embodiment. If an auction successfully concludes with an auction winner determined 225, an order may be created 240 in the seller's business information management system(s) in preparation for the winner performing any checkout procedures 245-260 and completing the auction transaction according to this embodiment. The order may be created 240 using the winner information and the quotation generated during the publication process. In addition, the order may be tied to the reservation of the quantity in the seller's business information management system(s) if a reservation was made. In conjunction with creating an order 240, an email notification may be sent to the winner informing him/her about winning and providing a link, such as for example a URL link, in the email that the winning bidder may click on 245 to connect the buyer to the seller's e-commerce site according to one embodiment of the present invention. The buyer may first need to login to the e-commerce site (e.g., a business-to-business e-commerce site) before the buyer may be presented with the order for the auction or, alternatively (if for example the login information is already stored or the buyer is already logged in) the buyer may immediately be presented with this information. The quotation, reservation, and order may all be linked using for example an auction identifier or other means to associate these related items. Clicking on the link 245 in the email is only one means by which the winner may initiate the checkout process for the auction. For example, the winner may also go to seller's e-commerce site on their own and retrieve their won auction information and continue the checkout process.

The checkout process according to one embodiment of the present invention includes filling out the auction order specific information that is still required along with any order modification that the winner (i.e., the winning bidder) may want to make. The winner initiates the checkout process 245 using one of the available means, for example, by responding to a link in a winner notification email. As part of the checkout process, a winner may be permitted by the seller to modify the order. If allowed to do so, the winner may decide 250 whether to make order modifications 255 during the checkout process. If the winner decides to modify the order 250, the winner makes the order modifications 255 and continues with the checkout process. For example, the winner may purchase related or accessory products by adding them to the auction order. The checkout process may also include providing shipping information, billing information and/or other information in order to complete the order 260. The winner may provide this information in order to complete 260 the checkout process. On the completion of the checkout process 260, the order is released 265 meaning that any block on the order may be removed and the order may be processed by the seller's business information management system(s) concluding 270 the internal auction process according to this embodiment of the present invention.

FIG. 3 is an example data record for a reservation of a specified auction quantity of a product and/or service according to one embodiment of the present invention. The term data record is used interchangeable with row and/or tuple and is not intended to identify or limit the seller's business information management system(s) as hierarchical database systems. The data record 300 shown in FIG. 3 is a simplification of the data items that may exist in a seller business information management system in order to implement a reservation according to one embodiment of the present invention. The data record 300 contains an auction identifier 311 which identifies the auction with which the reservation is associated. The product identifier 312 identifies the product and/or service for which this reservation is made. For an auction with multiple products and/or services, a separate reservation for a each product/service may be made in one embodiment of the present invention or a single reservation may be made for all the products and/or services which in turn may require multiple records in one more database tables for seller business information management systems based on, for example, normalized databases. The quantity 313 is the quantity of the product and/or service that is reserved or in other words the specified auction quantity of the product and/or service. The end date and time 314 is one or more fields that indicate when a reservation will automatically be released regardless of the auction status if the reservation has not already been used to generate an order. The auction identifier 311 may generally be used to identify the reservation but where more than one reservation may exist for an auction and because it may facilitate reservation tracking in the seller's business information management system(s) a separate reservation identifier 310 may also be used according to another embodiment of the present invention as indicated by the dashed lines in FIG. 3. The data record shown in FIG. 3 is an example for illustration purposes while an actual reservation may tie data from several tables/files in a database to a reservation.

Figure 4:
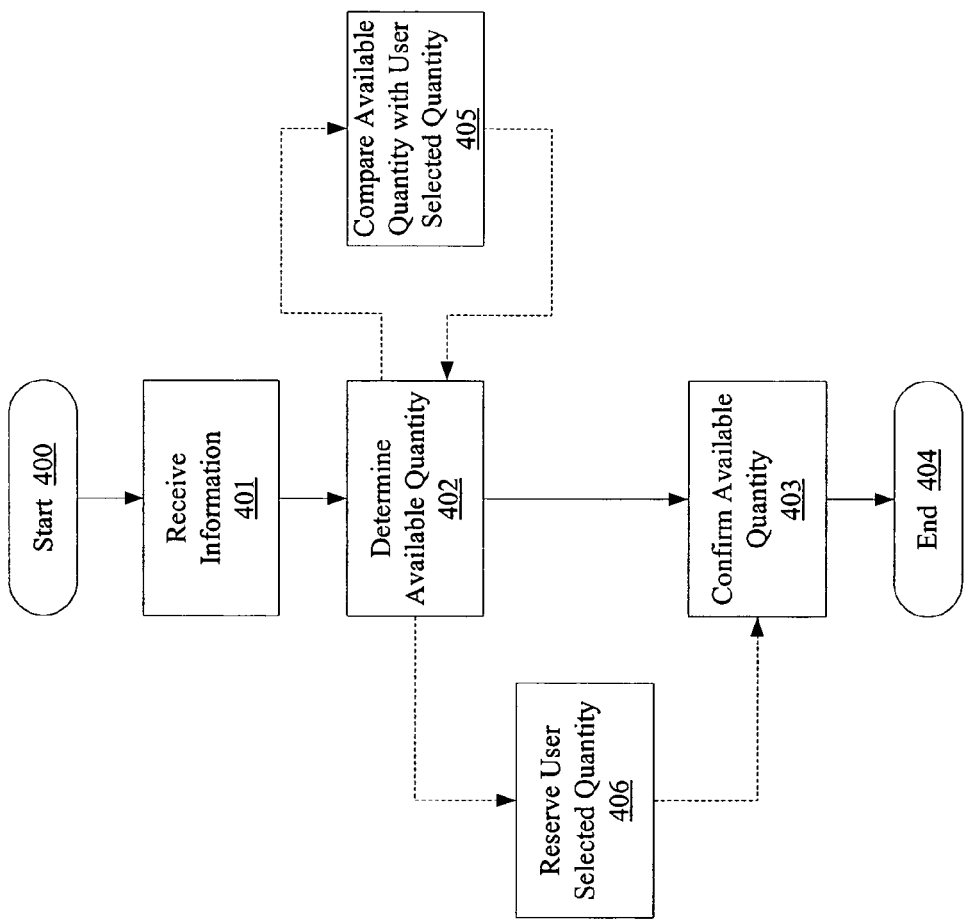
FIG. 4 is a flowchart illustrating a method for checking product availability for an internal auction system according to one embodiment of the present invention.

FIG. 4 is a flowchart illustrating a method for checking product availability for an internal auction system according to one embodiment of the present invention. Checking the availability of a product and/or service may occur at one or more points in the internal auction process according to one embodiment of the present invention. For example, availability may be checked when an auction is being generated in order to present the seller with an available quantity from which to chose when generating the auction and/or to determine if the seller generated auction can be fulfilled based on the available quantity. Availability of a product and/or service may be determined from information stored in a seller's business information management system as previously discussed. For example, an inventory system may be a seller's information management system containing product availability information. The method illustrated in the flowchart of FIG. 4 begins 400 with receiving information 401, such as the designation of a product and/or service for an auction, from the seller 110. The received information 401 may include, for example, a designation of the product and/or service to be included in an auction as previously stated or may include a specified quantity for the product and/or service in the auction. The process outlined in FIG. 4 may be applied regardless of whether the received information includes a specified quantity.

The initiation of the availability determination method according to this embodiment may occur at one more points in the internal auction process. For example using the embodiment of the internal auction process depicted in FIG. 2 and discussed above, an availability determination may made when an auction is first created 205. At this point in the process, the received information 401 may include a seller designated product and/or service (without a specified quantity) for which availability may be returned to the seller to assist in creating the auction. The received information 401 may also include a seller designated quantity (i.e., a specified quantity) of a product and/or service for which a verification of availability may be determined with an appropriate notification to the seller. An availability determination may also be made (additional to or instead of at the auction creation step 205) when an auction is published 210. At this point in the process, the received information 401 may include a specified quantity of a product and/or service in the auction being published for which an availability determination is made. The availability determination may be used to warn a seller about insufficient availability when the seller tries to publish the auction or it may alternatively be used to prevent the publication of an auction where there is insufficient availability. An availability determination may also be made (additional to or instead of the prior determinations discussed above) when determining an auction winner. Lack of availability for a product and/or service in an auction may be used to terminate the auction without a winner rather than determine a winner for an auction that can not be fulfilled. In yet another example, an auction determination may be made (additional to or instead of one or more of the prior determinations discussed above) when an order for an auction is created. Lack of availability may be used to notify a winner (a winning bidder on the auction) about a delay in order fulfillment. These examples indicate that this availability determination may occur at one or more steps in the internal auction process in different embodiments of the present invention.

The second step 402 in the availability determination method according to this embodiment is to determine the available quantity of the product identified in the received information 401. The available quantity may be determined using a seller's business information management system(s) 140 according to one embodiment of the present invention. For example, a seller's business information management system(s) 140 may include an inventory system, warehousing system, product/asset tracking system, etc. which may provide the necessary information to determine the available quantity of a product. As previously stated, the received information may or may not include a specified quantity of the product for an auction. If the received information 401 does include a specified quantity of the product then the available quantity may be compared with the specified quantity in a circumstance dependent (it depends on the existence of a specified quantity for a product or service in the received information 401) third step 405 of the availability determination method according to this embodiment. An optional fourth step 406 may include placing a reservation on the quantity of the product where a specified quantity for an auction is equal to or less than an available quantity for the product or service. This reservation step 406 is optional because a reservation for the specified quantity may already be made elsewhere making this a redundant step or no reservation may be made in an alternative embodiment of the present invention making this an unnecessary step. The availability is confirmed 403 to the seller and/or internal auction application in the last step of the availability determination process before it ends 404 according to this embodiment.

Figure 5:
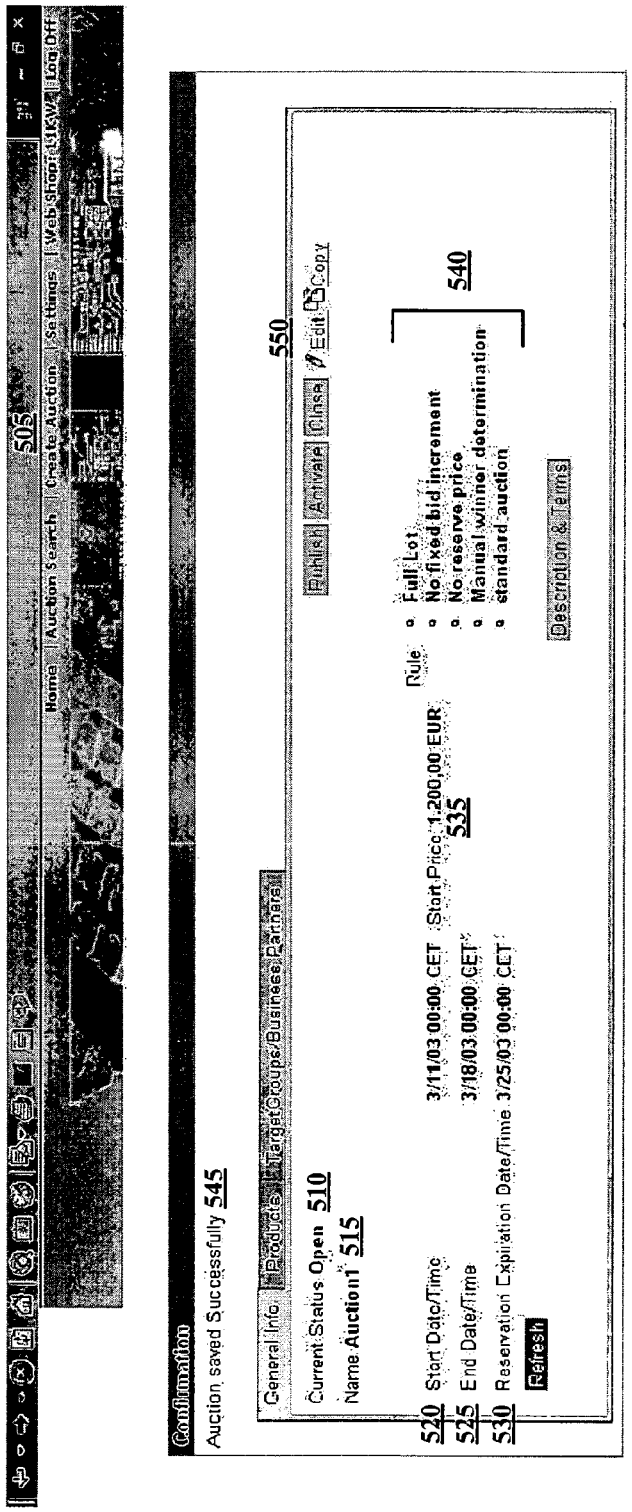
FIG. 5 is a screen shot from an internal auction application illustrating a confirmation screen for a newly created auction with an associated reservation according to one embodiment of the present invention.

FIG. 5 is a screen shot from an internal auction application illustrating a confirmation screen for a newly created auction with an associated reservation according to one embodiment of the present invention. According to this embodiment, the internal auction application 120 links a seller's existing business information management system(s) 140 with a seller's e-commerce site 115 in order to provide internal auction services. The internal auction application 120 may be a component-based multi-tier application developed according to the Java® 2 platform, enterprise edition standard (J2EE®) and running on top of a web application server according to this embodiment. This embodiment is only one example of the platforms and software that may be used for the internal auction application.

A seller may use the internal auction application 120 to create or generate an auction. This may be accomplished by selecting a create option link 505 on the screen 500 of internal auction application 120 or through the use of menu items (not shown), buttons (not shown), or other known means (not shown). As a result of this selection 505, a seller may be presented a screen or window (not shown) in which he/she may enter auction specific information for the new auction. If he/she saves the auction a confirmation screen 500 such as the one shown for example in FIG. 5 may be displayed. The auction status 510 is shown as "Open" indicating that the auction has been created, is not published or activated, and has not been closed in this embodiment. Other auction information shown includes the auction name 515, the start date/time 520 for the auction, the end date/time 525 for the auction, a reservation expiration date/time 530, a starting price 535, and auction rules 540. These items may be automatically generated using default and/or profile values or may be set by the seller when the auction is created. These items may also be updated by the seller for an already created auction as indicated by the "Edit" link 550 on the screen 500. In addition, a message 545 is provided on the confirmation screen 500 shown in FIG. 5 indicating that the auction has been successfully saved.

The reservation expiration date/time 530 on the confirmation screen 500 in the embodiment of the internal auction application partially shown in FIG. 5 indicates that a reservation was made for a quantity of the product in the auction with an expiration date 530 of seven days after the auction ends 525 (i.e., the reservation expires Mar. 25, 2003 00:00 CET which is seven days after the auction ends on Mar. 18, 2003 00:00 CET). As previously discussed, a reservation is the reserving or blocking of a quantity of a product and/or service through a seller's business information management system(s) in order to ensure the availability of that quantity of the product and/or service for an order for the winner of the successfully completed auction. In effect, a reservation may prevent the reserved quantity of the product and/or service from being otherwise disposed of. This quantity may be an existing quantity or may also include anticipated quantities that will become available on a particular date. For example if a seller has 500 units of product A currently available and seller's manufacturing facilities will produce another 200 units of product A by September 17, an auction for a single lot of 600 units of product A with a closing date of September 20 may have 700 units of product A (the 500 already existing and in stock unit plus the 200 units becoming available on September 17) available from which to make a reservation according to this embodiment.

Figure 6:
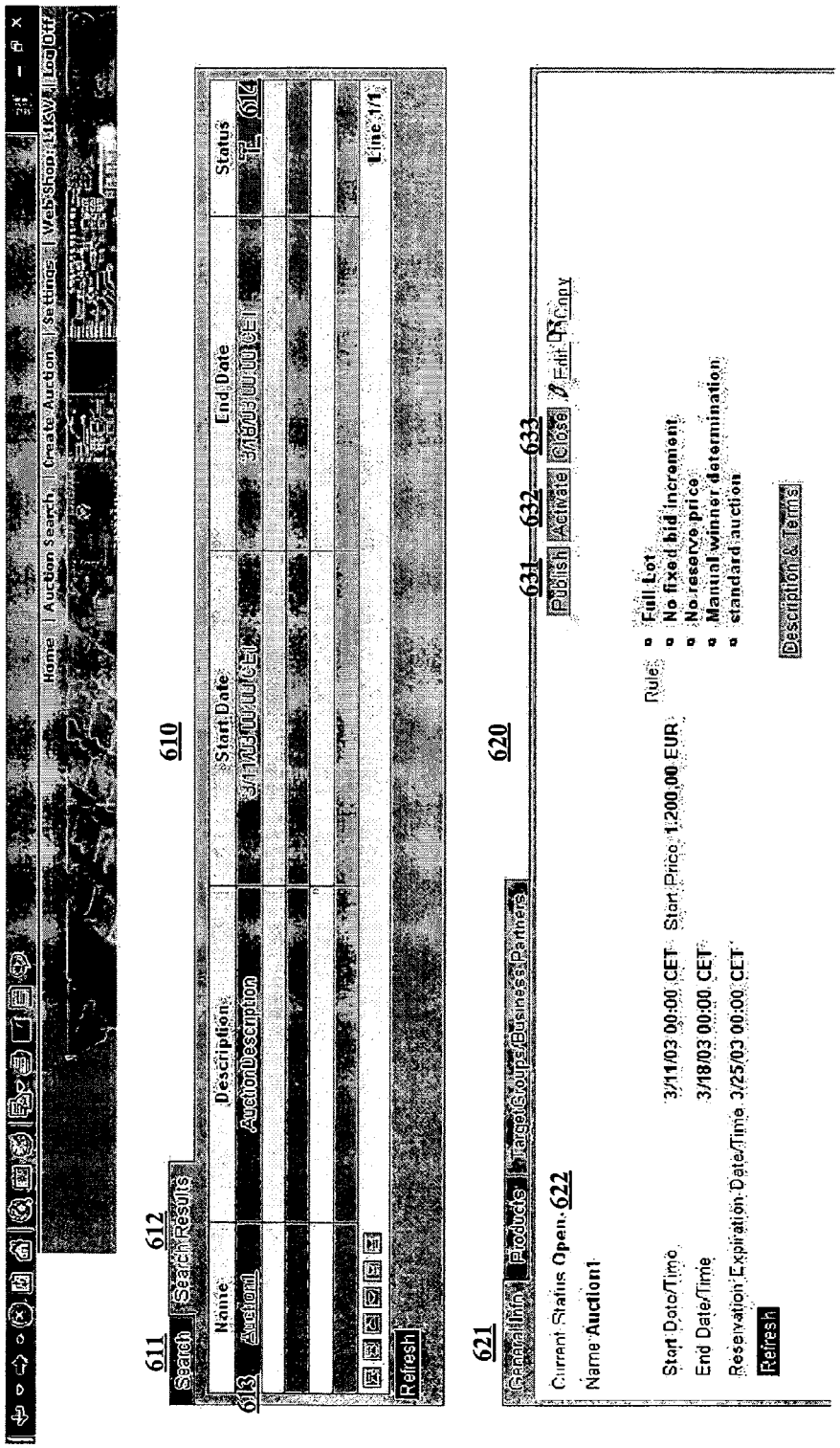
FIG. 6 is a screen shot from an internal auction application illustrating the details of an already created auction with an associated reservation that may be published and/or activated according to one embodiment of the present invention. The FIG. 7 is a screen shot from an internal auction application illustrating the alert presented to a seller as a result of an attempt to activate an already created and saved auction with an associated reservation according to one embodiment of the present invention.

FIG. 6 is a screen shot from an internal auction application illustrating the details of an already created auction with an associated reservation that may be published and/or activated according to one embodiment of the present invention. An auction listing table 610 in the screen 600 may be used to display existing auctions created by the seller. For example, it may contain the search results for a search of a seller's existing auctions. The search parameters (not shown) may be entered using the "Search" tab 611 with the search results shown in the "Search Results" tab 612 of the seller side application 121 of the internal auction application 120. Clicking on an auction 613 in the search results may result in the display of a detailed auction information table 620 as shown in this embodiment. The detailed auction information table 620 may also contain several tabs of information including the "General Info" tab 621 shown. The status 622 of this auction is "Open" which corresponds with an open auction icon 614 in the auction listing table 610. The detailed auction information table 620 may contain a "Reservations" tab (not shown) which may contain details regarding the reservation of the products and/or services in the auction according to one embodiment of the present invention. Several example auction action buttons 631-633 are shown which in this embodiment allow the seller to publish 631, activate 632, and close 633 an auction. These buttons are only one method of providing these auction actions and any known method such as, for example, pull-down menus, etc. may also be used. Publishing 631 an auction results in the auction being scheduled to begin at the designated start date/time as previously discussed. Activating 632 an auction results in the auction being immediately published regardless of the scheduled start date/time. Closing 633 an auction results in the auction being closed regardless of the current auction status.

Figure 7:
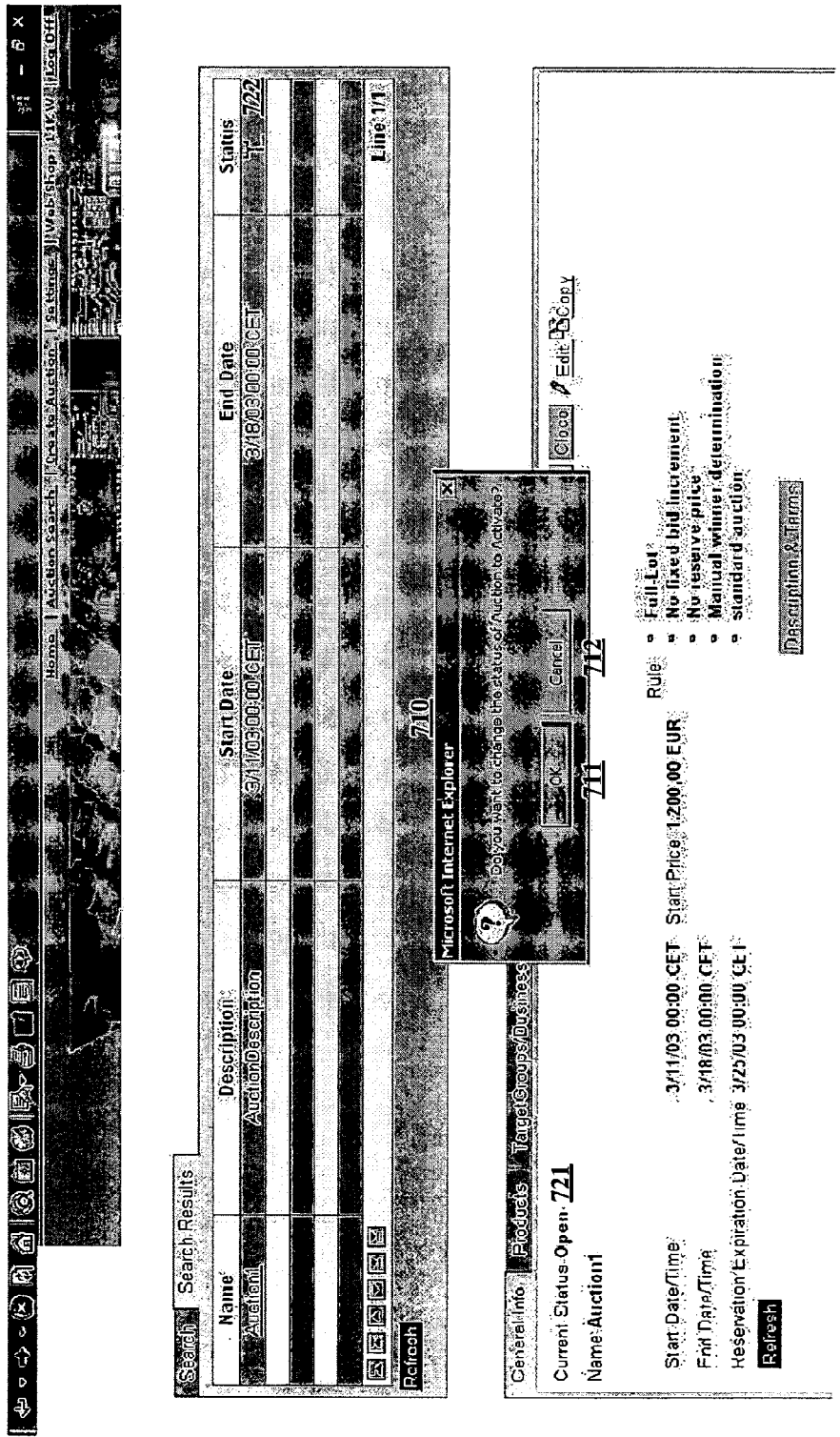
Figure 8:
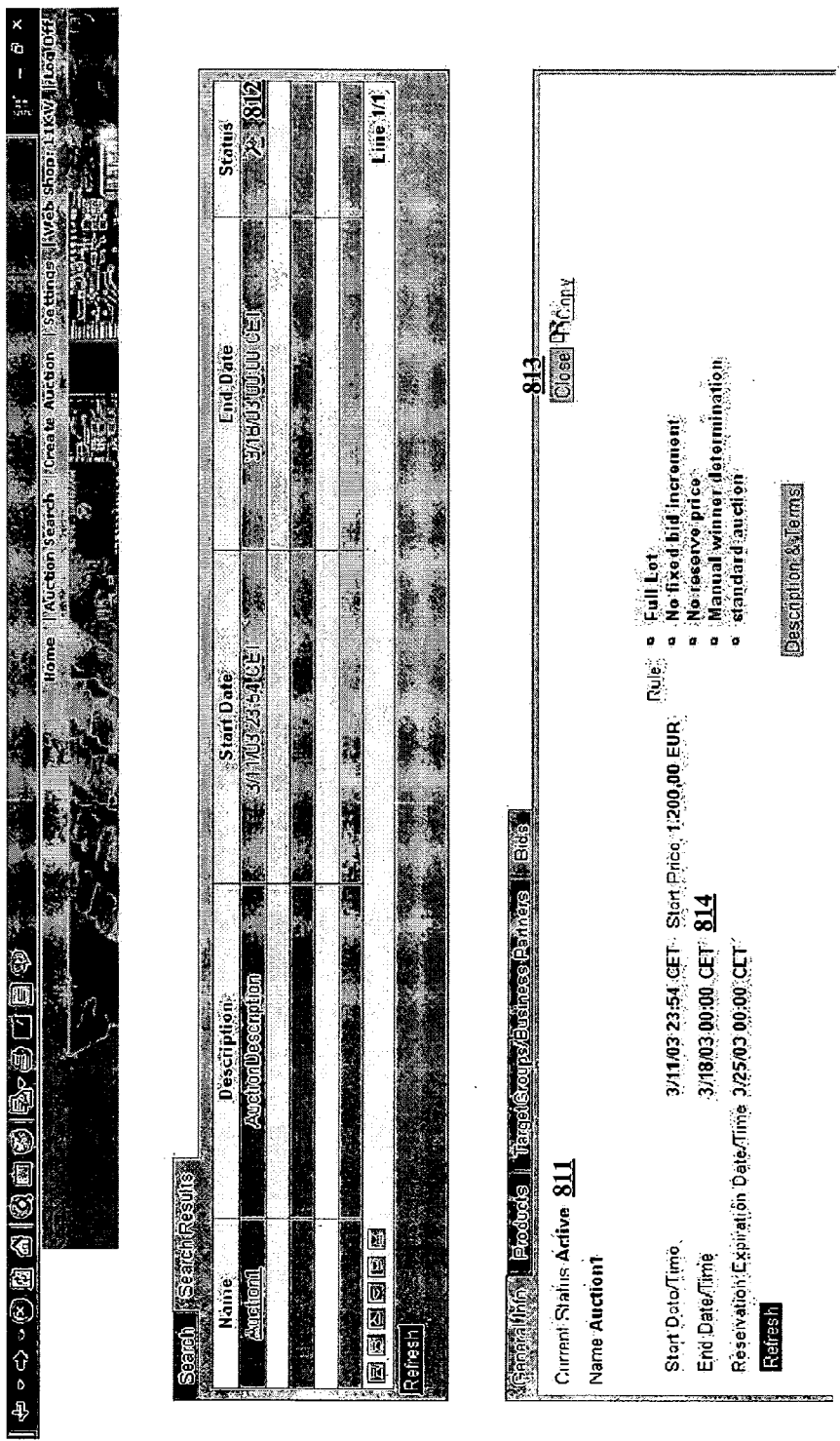
FIG. 8 is a screen shot from an internal auction application illustrating the change in the status of an auction resulting from a seller's activation of the auction according to one embodiment of the present invention.

FIG. 7 is a screen shot from an internal auction application illustrating the alert presented to a seller as a result of an attempt to activate an already created and saved auction with an associated reservation according to one embodiment of the present invention. When a seller initiates an auction action that changes the status of the auction such as by selecting (e.g., clicking on) one of the auction action buttons 631-633 shown in FIG. 6, an alert 710 may be presented to the seller asking for confirmation about the change to the current auction status 721, 722. The use of alerts is commonly known and is shown herein to illustrate a change of the auction status. The seller may abort the auction action—in this example, an activation of the auction—by selecting the cancel 712 key or the seller may confirm and initiate the action 711. FIG. 8 is a screen shot from an internal auction application illustrating the change in the status of an auction resulting from a seller's activation of the auction according to one embodiment of the present invention. The status 811 of the auction is now "Active" instead of "Open" and the associated status icon 812 is also change to indicate an active auction. The auction actions now available to the seller no longer include publish 631, activate 632, and close 633 shown in FIG. 6 but is now limited to close 813 as a result of the context-sensitive (in this example the auction status-sensitive) display of options shown in this embodiment. An activated or published auction may be closed either manually by the seller initiating the close auction action 813 or an auction may automatically close when the scheduled end date/time 814 of the auction arrives. The closing of an auction and the successful determination of an auction winner may result in an order being created for the auction in one embodiment of the present invention. For example, the order may be created in the seller's business information management system(s). In an alternative embodiment, the closing of an auction may initiate the creating of an order for the auction using the reservation even before the designation of a winner. An existing reservation may be used in generating an order but even without a reservation, an order may be generated in this embodiment.

Figure 9:
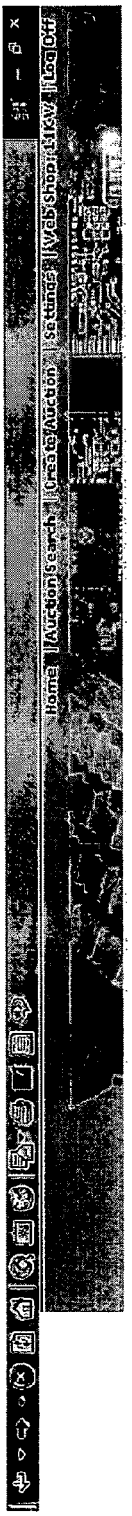
FIG. 9 is a screen shot from an internal auction application illustrating the change in the status of an auction resulting from a seller's manual termination of the auction according to one embodiment of the present invention.
Figure 9:
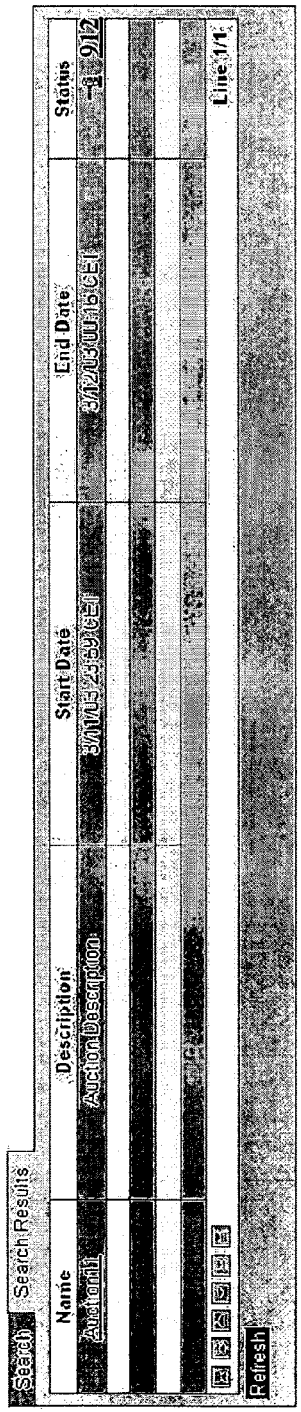
Figure 9:
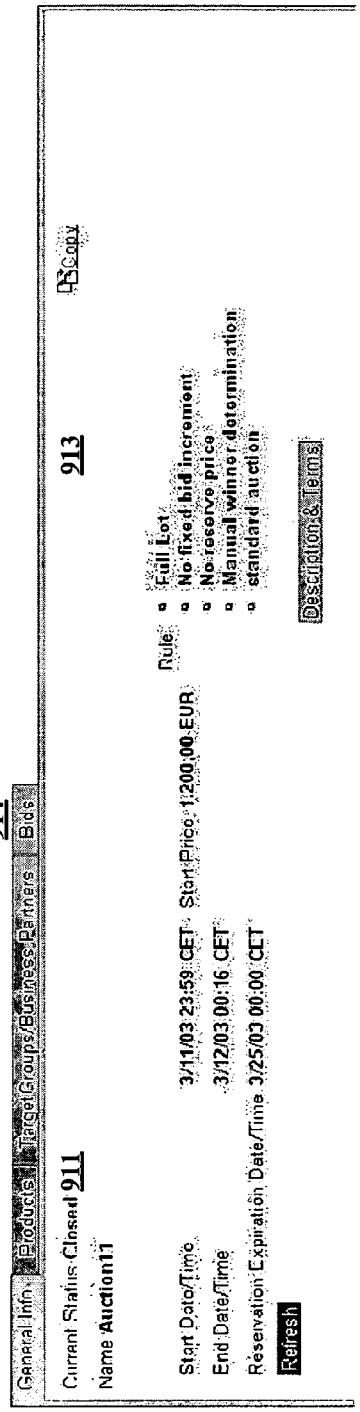

FIG. 9 is a screen shot from an internal auction application illustrating the change in the status of an auction resulting from a seller's manual termination of the auction according to one embodiment of the present invention. If the seller manually closes an auction by, for example, selecting (e.g., clicking on) the close auction action button 813 shown in FIG. 8 or the auction automatically closes when the end date/time is reached, the status of the auction 911 may be changed to "Closed" with an associated change in the auction status icon 912. If the auction is closed from an open status meaning that the auction was never published or activated, there are no bidders and this change effectively cancels the auction. Under these circumstances according to this embodiment, no order will be generated for the auction because there is no likelihood of a successful winner determination and, therefore, the associated reservation may be released and any quotation rescinded. If however the auction is closed from an active or published status, bidders on the auction may exist by the time the auction is closed. These bids are shown in an additional "Bids" tab 914 that may first be associated with the detailed auction information table 910 when the auction is activated or published. Once an auction is closed, no further auction actions (e.g., publish, activate, etc.) may be taken according to this embodiment and, therefore, the auction action buttons previously shown are no longer present 913 in the detailed auction information table 910.

Figure 10:
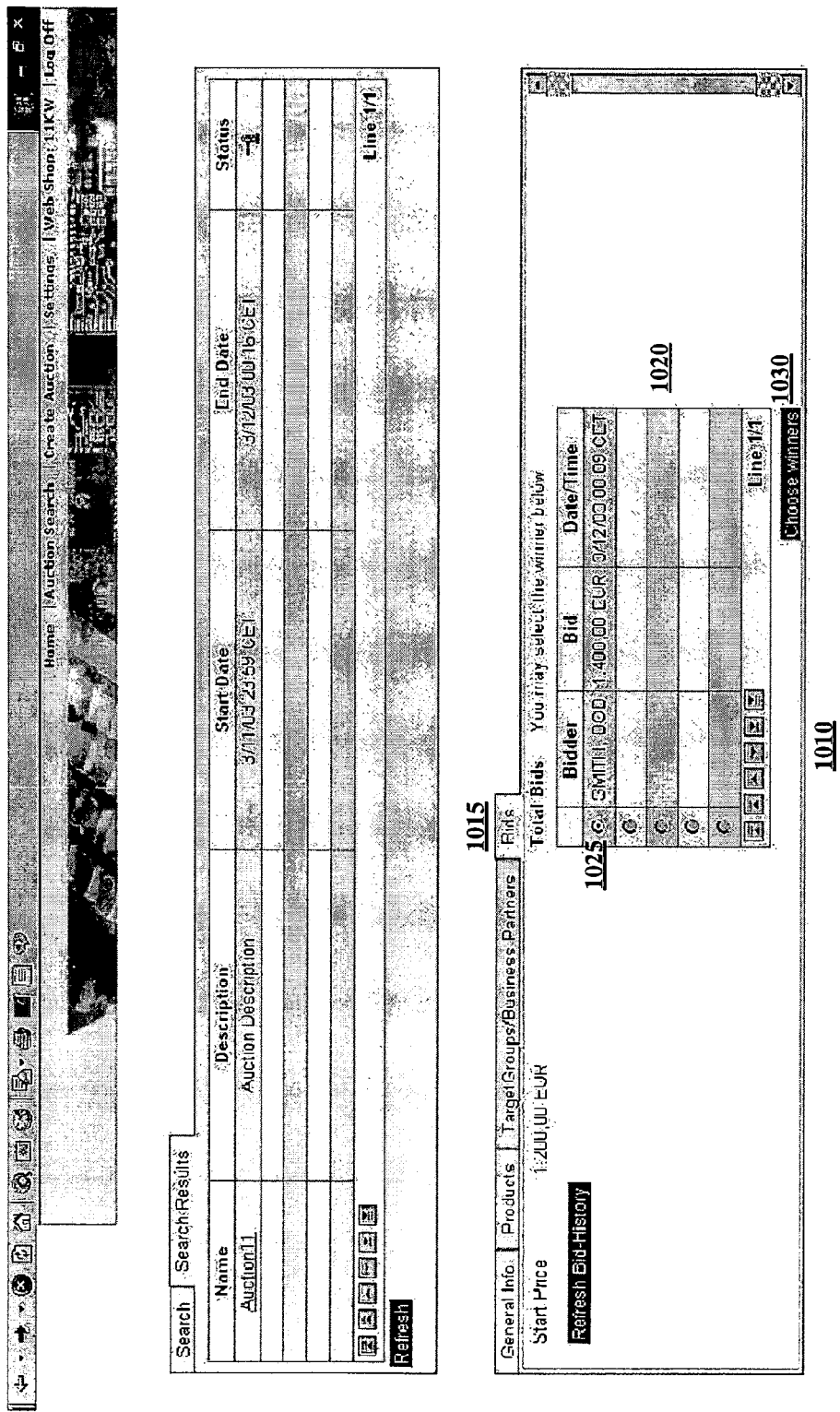
FIG. 10 is a screen shot from an internal auction application illustrating the bids received for an auction that has been concluded according to one embodiment of the present invention.
Figure 11:
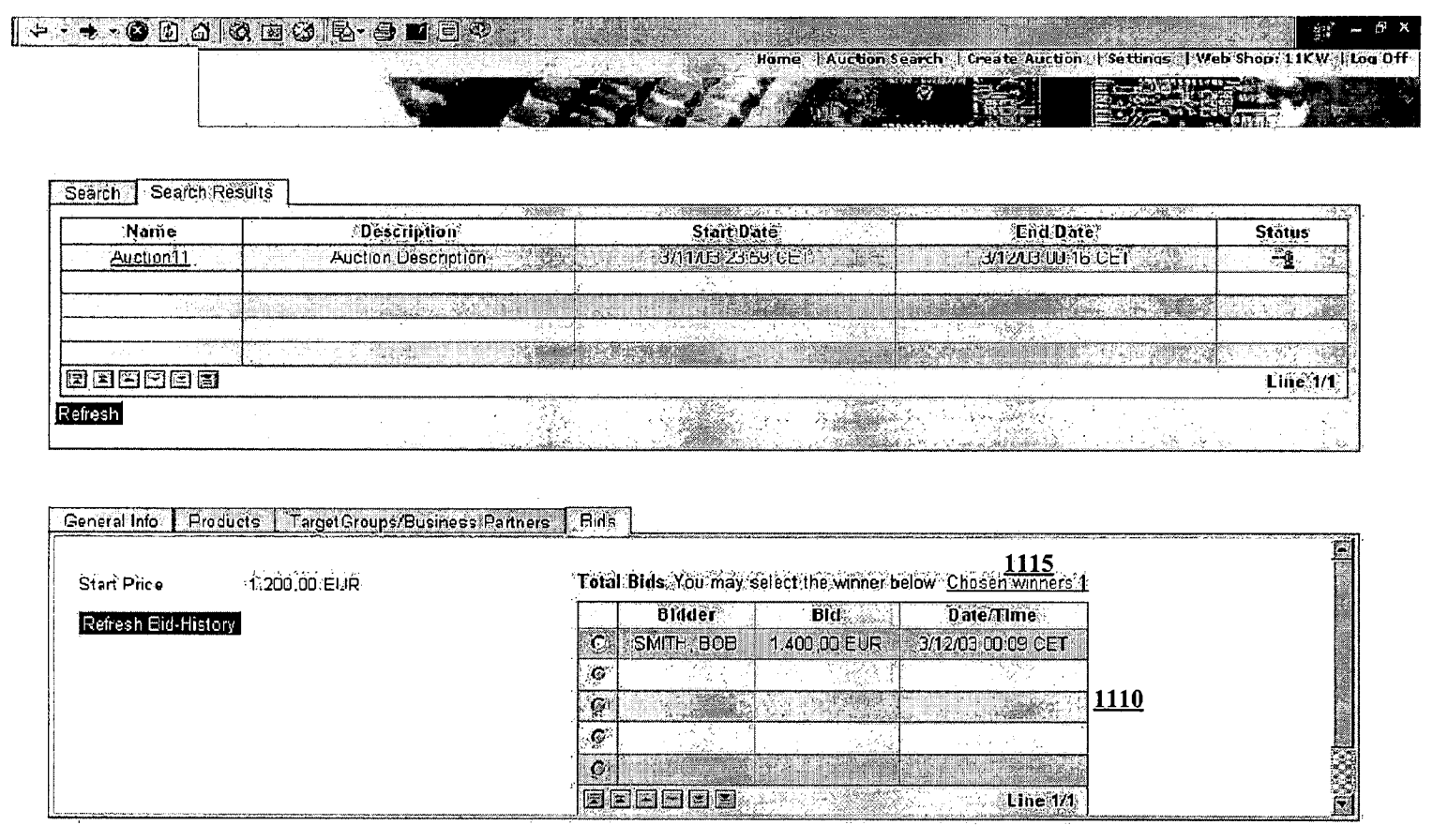

FIG. 10 is a screen shot from an internal auction application illustrating the bids received for an auction that has been concluded according to one embodiment of the present invention. The embodiment depicted in FIG. 10 is for an auction where the seller manually determines an auction winner. The "Bids" tab 1015 of the detailed auction information table 1010 contains a listing 1020 of the bidders on the auction—in this example, only one. From this listing 1020 a seller may choose one or more winners of the auction by indicating the winners in the associated radio field 1025 and selecting the "Choose winners" button 1030. Once a winner is selected, a confirmation may additionally be presented to the seller for the seller to indicate that he/she has completed the selection of all the winners before proceeding. FIG. 11 is a screen shot from an internal auction application illustrating a seller's manual selection of one winning bidder for an auction according to one embodiment of the present invention. FIG. 11 illustrates the confirmation displayed for the one selected winner from the screen in FIG. 10. A confirmation link "Chosen winners 1" 1115 is presented to the seller above the bidder listing 1110 indicating to the seller the number of winners selected. As the seller selects additional winners, this message will reflect the total winners according to this embodiment. Selecting this confirmation link 1115 continues the winner selection process.

Figure 12:
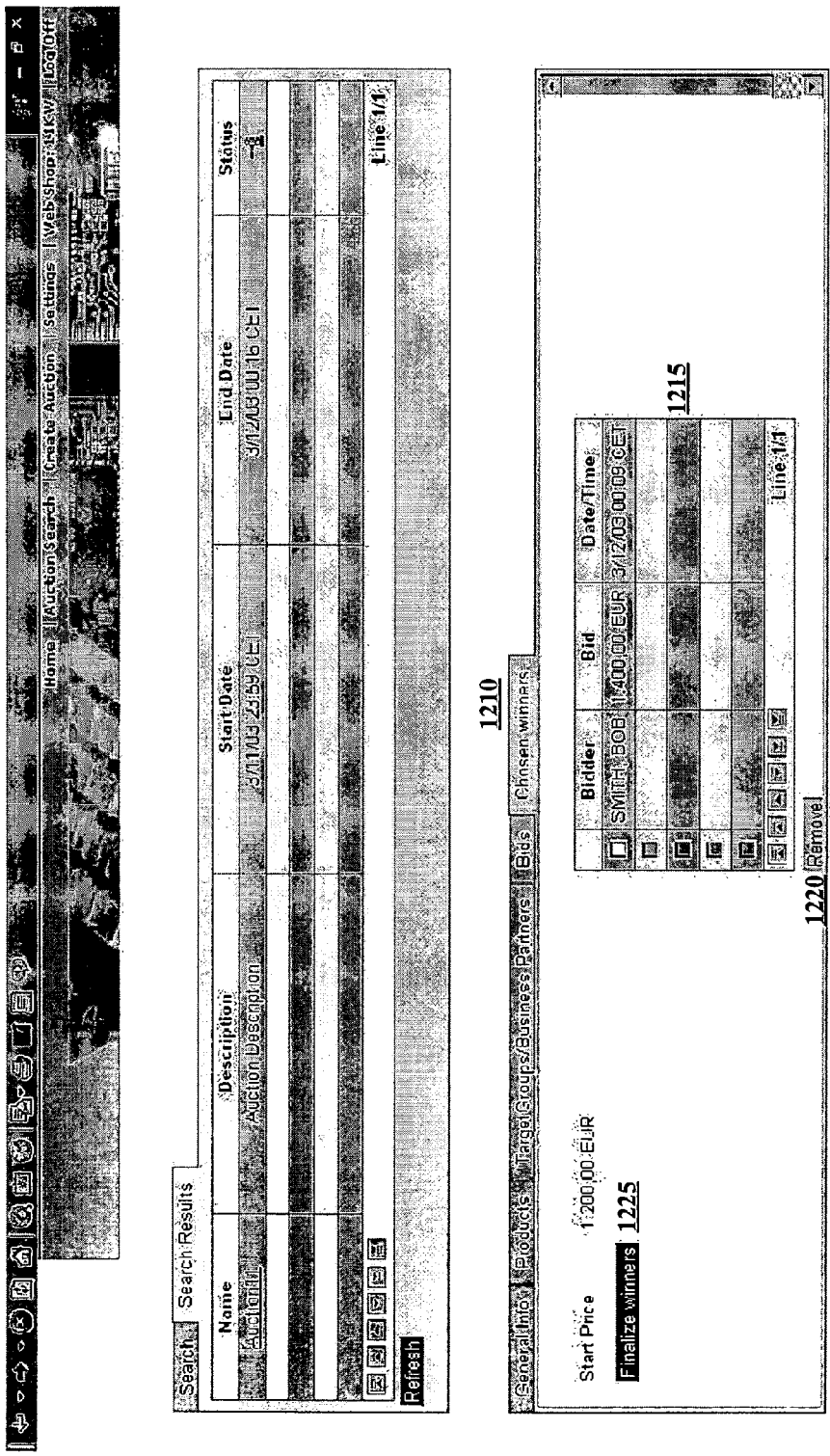
FIG. 12 is a screen shot from an internal auction application illustrating a tab containing the chosen winners for an auction as a result of a manual winner selection process according to one embodiment of the present invention.
Figure 13:
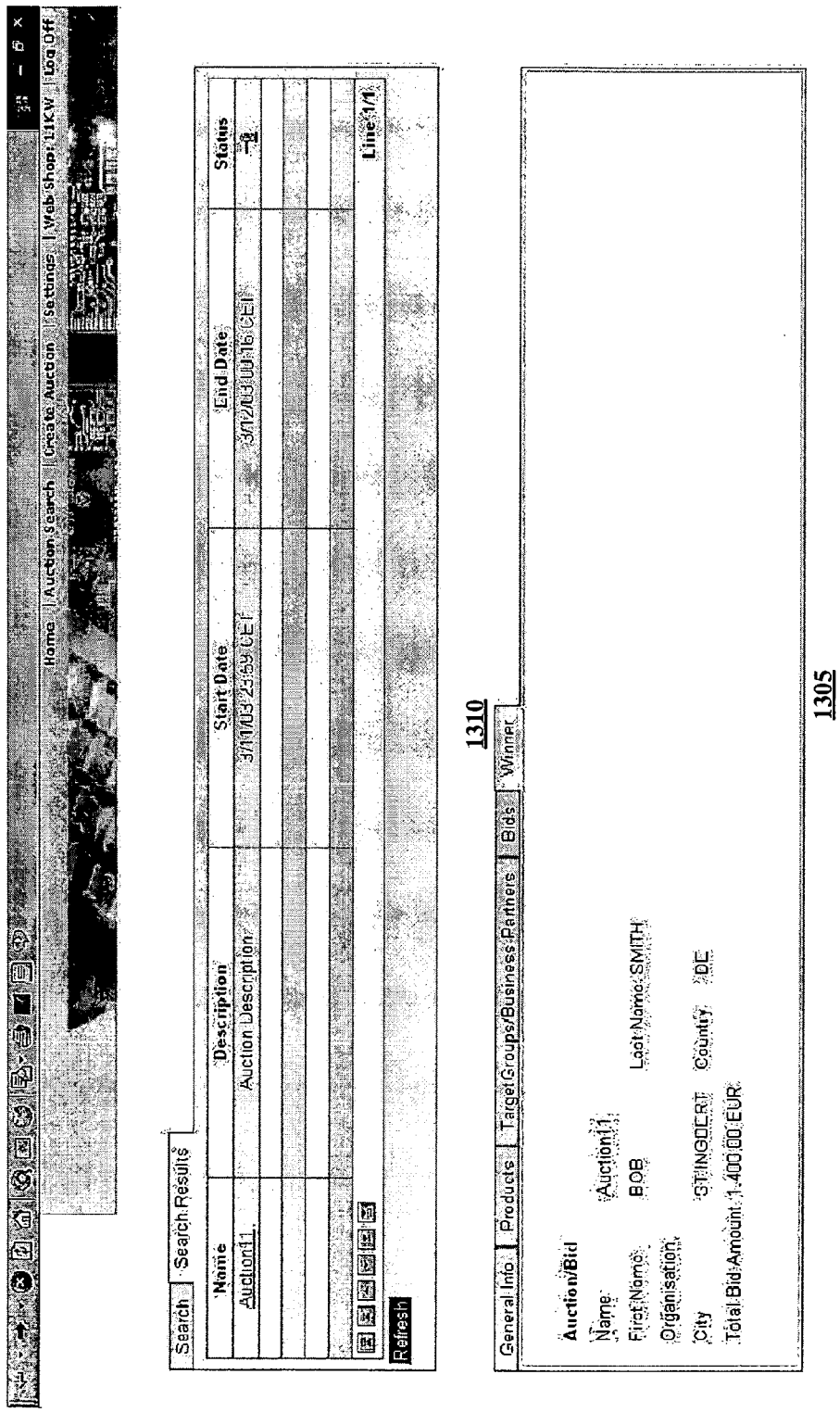
FIG. 13 is a screen shot from an internal auction application illustrating the finalized list of winners manually selected by a seller according to one embodiment of the present invention.

FIG. 12 is a screen shot from an internal auction application illustrating a tab containing the chosen winners for an auction as a result of a manual winner selection process according to one embodiment of the present invention. Once the seller chooses the auction winners according to this embodiment of the manual winner selection process, a new tab "Chosen winners" 1210 is added to the detailed auction information table 1205 containing a listing of the auction winners 1215. The seller may remove 1220 selected winners and/or finalize the selection of winners 1225 by making the appropriate selections in this tab 1210. FIG. 13 is a screen shot from an internal auction application illustrating the finalized list of winners manually selected by a seller according to one embodiment of the present invention. When the list of winners is finalized 1225 by the seller, the "Chosen winners" tab 1210 may be removed from the detailed auction information table 1305 and a new "Winner" tab 1310 added. In the example shown in FIG. 13, a single winner exists for "Auction11" however in other embodiments multiple winners may exist for an auction. The selection of a winner for a closed auction may result in an order being generated for the auction according to one embodiment of the present invention. Therefore, the selection of the "Finalize winner" button 1225 may also initiate the creation of an order in the seller's business information management system(s) 140 to create an order based on any existing reservation 530, which in this example was indicated in FIG. 5 among others. In alternative embodiments of the present invention, the order may be generated at other times such as, for example, on the closing of the auction or when the winning bidder completes the checkout process. The order may be partially generated according to this embodiment because other information may still need to be supplied by the winning bidder during the checkout process. The order may be generated using the existing reservation by associating a reservation identifier and/or an auction identifier with the auction and with the generated order allowing a seller's business information management system(s) to process the reservation along with the order.

Figure 14:
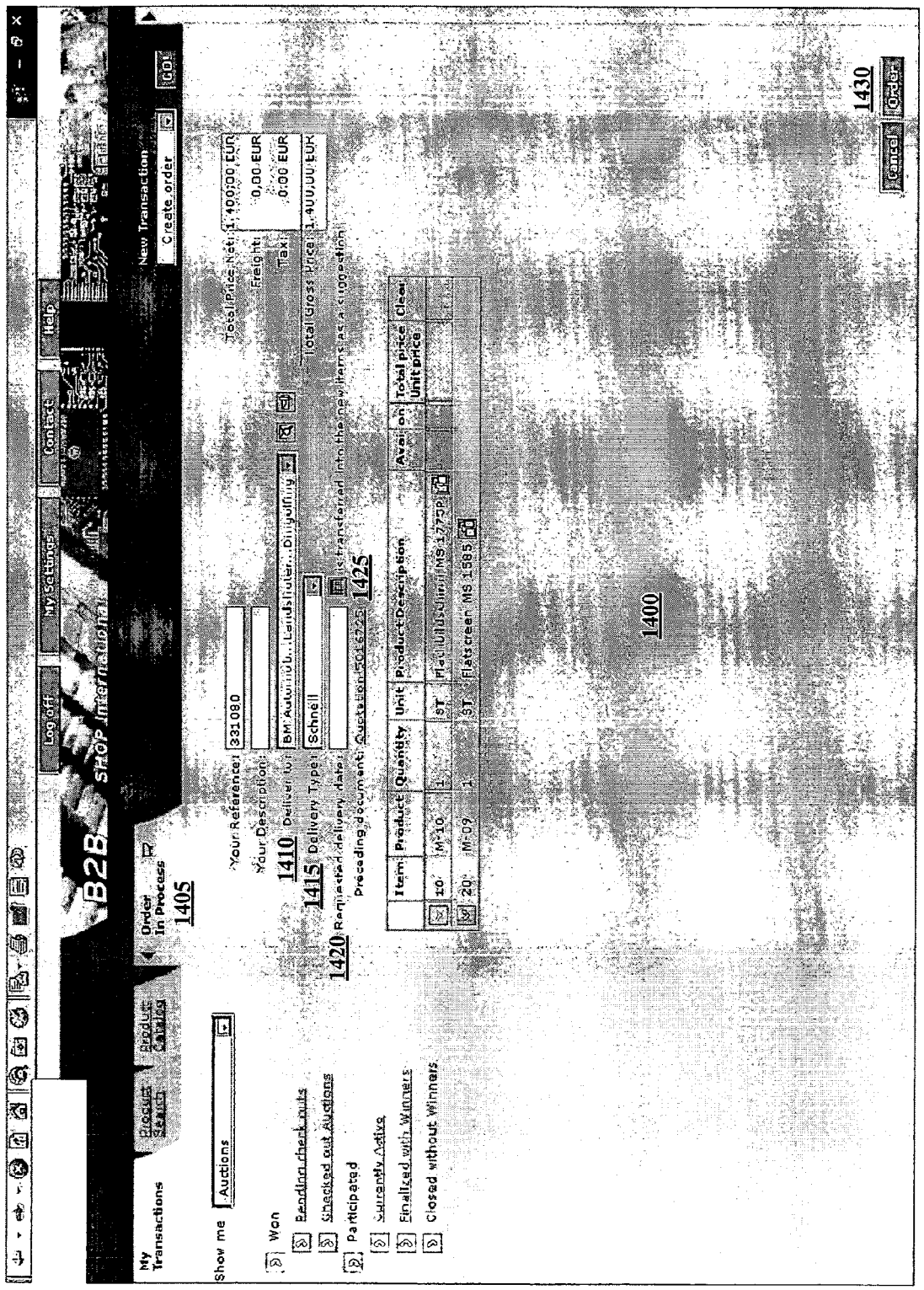
FIG. 14 is a screen shot from a seller's e-commerce site illustrating the winning bidder's checkout options and additional information requested by the seller according to one embodiment of the present invention.

FIG. 14 is a screen shot from a seller's e-commerce site illustrating the winning bidder's checkout options and additional information requested by the seller according to one embodiment of the present invention. According to this embodiment, the winning bidder may receive notification of winning the auction. This notification may be on the seller's e-commerce site 115 in the form of, for example, a banner, message, and/or pop-up notification when the buyer next logs into the site 115. This notification may also be an email notification to the winning bidder. Alternatively, no notification may be provided with the winning bidder required to check the seller's e-commerce to determine his/her winning status. As previously discussed for one embodiment of the present invention, the notification may contain, regardless of its format, a link to a checkout screen 1400 from which the winning bidder may complete the checkout process for the auction order. This checkout screen 1400 may also be accessed through the seller's e-commerce site 115. The "Order In Process" notification 1405 indicates that an order has already been created for the winning bidder and the checkout process is a completion of the order according to this embodiment. The winning bidder may provide additional information necessary to complete the order such as, for example, payment information (not shown), delivery address 1410, delivery type 1415, requested delivery date 1420, etc. In addition to payment and/or delivery information that may be provided or changed during the checkout process, the winning bidder may also be allowed to make order modifications as previously discussed. These order modification options (not shown) may allow the winning bidder to add additional products to the order such as, for example, accessories. The user may also be presented with the quotation 1425 which is a sales document that may be considered a billing invoice for the order. The quotation, as previously discussed, may also facilitate generating a reservation for the product and/or service in the auction in the seller's business information management system(s). Once the winning bidder makes any desired or necessary changes and places the finalized order by selecting the "Order" button 1430 or by other means, the order is finalized in the seller's business information management system(s) with any blocks on the order removed and it may be fully processed. The internal auction application 120 facilitates the checkout process between the winning bidder (i.e., the buyer) 105 using the seller's e-commerce site 115 and the seller's business information management system(s) 140.

Figure 15:
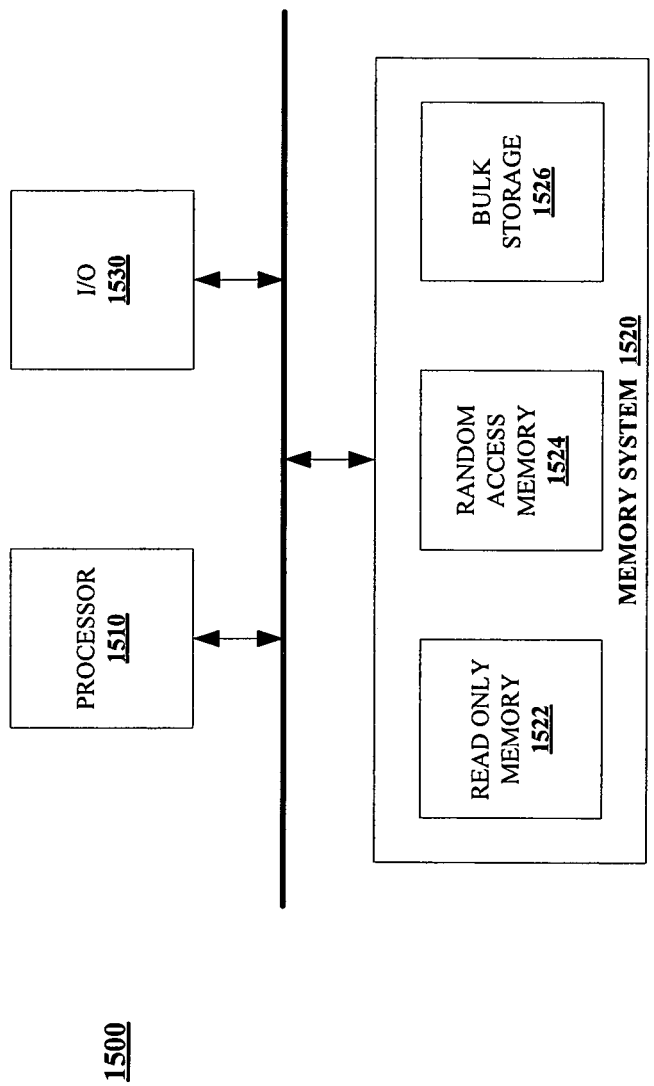
FIG. 15 is a block diagram illustrating the platform on which the method and system for providing a reservation mechanism as part of an integrated auction capability through a seller's e-commerce site may operate according to one embodiment of the present invention.

FIG. 15 is a block diagram illustrating the platform on which the method and system for providing a reservation mechanism as part of an integrated auction capability through a seller's e-commerce site may operate according to one embodiment of the present invention. Functionality of the foregoing embodiments may be provided on various computer platforms executing program instructions. One such platform 1500 is illustrated in the simplified block diagram of FIG. 15. There, the platform 1500 is shown as being populated by a processor 1510, a memory system 1520 and an input/output (I/O) unit 1530. The processor 1510 may be any of a plurality of conventional processing systems, including microprocessors, digital signal processors and field programmable logic arrays. In some applications, it may be advantageous to provide multiple processors (not shown) in the platform 1500. The processor(s) 1510 execute program instructions stored in the memory system. The memory system 1520 may include any combination of conventional memory circuits, including electrical, magnetic or optical memory systems. As shown in FIG. 15, the memory system may include read only memories 1522, random access memories 1524 and bulk storage 1526. The memory system not only stores the program instructions representing the various methods described herein but also can store the data items on which these methods operate. The I/O unit 1530 would permit communication with external devices (not shown).

What is claimed is:

1. A computer-implemented method for generating an order for a product in an auction in an internal auction system using an internal auction application, comprising:

creating, by the internal auction application executing on a processor, the auction for a quantity of the product in response to communication with a seller's business information management system that serves as a backend system to the internal auction application, wherein the internal auction application is a component based multi-tier application;

reserving, by the internal auction application executing on the processor, the quantity of the product in an inventory database of the seller's business information management system for at least the duration of the auction, wherein the reservation in the inventory database is done as a function in the internal auction application;

publishing, by the processor, the auction for the product on a seller's e-commerce site that serves as a front end system to the internal auction application;

determining, by the processor, a closed auction status indicating whether a winning bidder is determined;

generating, by the internal auction application executing on the processor, an order for the reserved product in the seller's business information management system in response to the closed auction status;

performing, by the internal auction application executing on the processor, a checkout process for the auction, wherein the winning bidder provides at least one of an order modification and an order data item through the internal auction application to the seller's business information management system; and releasing, by the internal auction application, the order to be processed by the seller's business information management system.

2. The computer-implemented method according to claim 1, further comprising:

sending, by the internal auction application, a quotation for a specified quantity of the product for the auction to the seller's business information management system.

3. The computer-implemented method according to claim 2, the generating step further comprising:

generating an order for the product in the auction as a function of the closed auction status and the quotation, wherein the internal auction application initiates the generating of the order in the seller's business information management system.

4. The computer-implemented method according to claim 1, further comprising:

retrieving an available quantity of the product from the seller's business information management system; and verifying a specified quantity of the product for the auction as a function of the available quantity.

5. The computer-implemented method according to claim 4, the generating step further comprising:

generating an order for the product in the auction as a function of the closed auction status and the verified specified quantity, wherein the internal auction application initiates the generating of the order in the seller's business information management system.

6. A system for generating an order for a product in an auction in an internal auction system using an internal auction application, comprising:

a memory system;

an input/output unit; and a processor, wherein the processor is adapted to:

(i) create by the internal auction application the auction for a quantity of the product in response to communication with a seller's business information management system that serves as a backend system to the internal auction application, wherein the internal application is a component based multi-tier application;

(ii) reserve by the internal auction application the quantity of the product in an inventory database of the seller's business information management system for at least the duration of the auction, wherein the reservation in the inventory database is done as a function in the internal auction application;

(iii) publish the auction for the product on a seller's e-commerce site that serves as a front end system to the internal auction application;

(iv) determine a closed auction status indicating whether a winning bidder is determined;

(v) generate by the internal auction application an order for the reserved product in the seller's business information management system in response to the closed auction status;

(vi) perform by the internal auction application a checkout process for the auction, wherein the winning bidder provides at least one of an order modification and an order data item through the internal auction application to the seller's business information management system; and (vii) release, by the internal auction application, the order to be processed by the seller's business information management system.

7. A non-transitory computer readable medium including instructions adapted to execute a method for generating an order for a product in an auction in an internal auction system using an internal auction application, the method comprising:

creating, by the internal auction application executing on a processor, the auction for a quantity of the product in response to communication with a seller's business information management system that serves as a backend system to the internal auction application, wherein the internal auction application is a multi-tier application;

reserving, by the internal auction application executing on the processor, the quantity of the product in an inventory database of the seller's business information management system for at least the duration of the auction, wherein the reservation in the inventory database is done as a function in the internal auction application;

publishing, by the processor, the auction for the product on a seller's e-commerce site that serves as a front end system to the internal auction application;

determining, by the processor, a closed auction status indicating whether a winning bidder is determined;

generating, by the internal auction application executing on the processor, an order for the reserved product in the seller's business information management system in response to the closed auction status;

performing, by the internal auction application executing on the processor, a checkout process for the auction, wherein the winning bidder provides at least one of an order modification and an order data item through the internal auction application to the seller's business information management system; and releasing, by the internal auction application, the order to be processed by the seller's business information management system.

\* \* \* \* \*